US012560092B2

(12) United States Patent
Chen et al.

(10) Patent No.: US 12,560,092 B2
(45) Date of Patent: Feb. 24, 2026

(54) COATING FOR ALUMINUM ALLOY AEROSTRUCTURES

(71) Applicant: RTX Corporation, Farmington, CT (US)

(72) Inventors: Lei Chen, South Windsor, CT (US); James O. Hansen, Hobe Sound, FL (US); Promila P. Bhaatia, Farmington, CT (US); Mark E. Simonds, Kennebunk, ME (US); Nicholas E. England, Alexandria, VA (US); William F. Bogue, Hebron, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/705,827

(22) PCT Filed: Oct. 28, 2022

(86) PCT No.: PCT/US2022/048174
§ 371 (c)(1),
(2) Date: Apr. 29, 2024

(87) PCT Pub. No.: WO2023/076564
PCT Pub. Date: May 4, 2023

(65) Prior Publication Data

US 2025/0003345 A1 Jan. 2, 2025

Related U.S. Application Data

(60) Provisional application No. 63/273,665, filed on Oct. 29, 2021.

(51) Int. Cl.
*F01D 5/28* (2006.01)
*C23F 11/18* (2006.01)
(Continued)

(52) U.S. Cl.
CPC ............ *F01D 5/288* (2013.01); *C23F 11/185* (2013.01); *C23F 17/00* (2013.01); *C25D 11/246* (2013.01);
(Continued)

(58) Field of Classification Search
CPC ... F01D 5/282; C25D 11/246; F05D 2230/90; F05D 2300/611
See application file for complete search history.

(56) References Cited

U.S. PATENT DOCUMENTS 6,403,230 B1 6/2002 Keener
7,527,872 B2 5/2009 Steele et al.
(Continued)

FOREIGN PATENT DOCUMENTS

EP 1464733 B1 4/2005
EP 3748125 A1 12/2020
(Continued)

OTHER PUBLICATIONS

"Technical Data Sheet BR® 127 Primer", Feb. 7, 2019, Solvay Composite Materials, Alpharetta, Georgia.
(Continued)

*Primary Examiner* — Michael L Sehn
(74) *Attorney, Agent, or Firm* — Bachman & LaPointe, P.C.

(57) ABSTRACT

An airfoil element including an airfoil having a pressure side and a suction side, an aluminum alloy substrate and a coating system atop the substrate, said coating comprising in at least one location an anodize layer (24) having a thickness ($T_A$) of 1.0 to 5.0 micrometer, a sealant (36) filling at least 5.0% of porosity in the anodize layer or at least 0.7% of an apparent volume within a height of the anodize layer, a sealant primer (40) filling 50.0% of porosity in the anodize layer or at least 6.5% of an apparent volume within a height
(Continued)

of the anodize layer and extending at least flush to the anodize layer, a second primer (44) over the sealant primer having a thickness ($T_S$) of 5.0 to 50 micrometer and a polymeric coating (48) having a thickness ($T_T$) of 10.0 micrometer to 1.0 millimeter.

24 Claims, 3 Drawing Sheets

(51) Int. Cl.
*C23F 17/00* (2006.01)
*C25D 11/24* (2006.01)

(52) U.S. Cl.
CPC .... *F05D 2230/90* (2013.01); *F05D 2300/611* (2013.01)

(56) References Cited

U.S. PATENT DOCUMENTS

| | | | | |
|---|---|---|---|---|
| 8,449,784 B2 * | 5/2013 | Parkos | C23F 1/44 216/96 |
| 10,760,164 B2 * | 9/2020 | Ding | C23F 13/005 |
| 10,774,008 B2 * | 9/2020 | Subramanian | F23R 3/007 |
| 10,801,123 B2 | 10/2020 | Ding et al. | |
| 10,828,667 B1 * | 11/2020 | Harner | C09D 9/00 |
| 2019/0127860 A1 | 5/2019 | Ding et al. | |
| 2019/0284673 A1 * | 9/2019 | Landwehr | C23C 28/347 |

FOREIGN PATENT DOCUMENTS

| | | |
|---|---|---|
| JP | H0225592 A | 1/1990 |
| RU | 2088621 C1 | 8/1997 |
| WO | 2010/017289 A1 | 2/2010 |

OTHER PUBLICATIONS

Weilong Zhang, "Systems Approach to REACH-compliant Coating Systems for Aerospace Applications", 2019 DoD Allied Nations Technical Corrosion Conference, Aug. 14, 2019, United Technologies Research Center, East Hartford, Connecticut.
Mark Jaworowski, "Development of a Nonchromate Structural Adhesive Bond Primer", 2014 AsetsDefense Meeting, Nov. 14, 2014, United Technologies Research Center, East Hartford, Connecticut retrieved from internet Sep. 29, 2021 https://apps.dtic.mil/sti/tr/pdf/ADA617072.pdf.
Eric Eichinger et al., "Hexavalent Chromium Elimination: An Aerospace Industry Progress Report", Metal Finishing, Mar. 1997, pp. 36-41, Elsevier Science, Inc., Amsterdam, Netherlands.
International Search Report and Written Opinion dated Mar. 7, 2023 for PCT/US2022/048174.
Safety Data Sheet, "44GN098 Base Component", Aug. 14, 2014, PPG Aerospace PRC-DeSoto, Sylmar, California.
Safety Data Sheet, "3M Scotch-WeldTM Structural Adhesive Primer EC-3917" Jun. 3, 2021, 3M, St. Paul, Minnesota.

* cited by examiner

COATING FOR ALUMINUM ALLOY AEROSTRUCTURES

CROSS-REFERENCE TO RELATED APPLICATION

Benefit is claimed of U.S. Patent Application No. 63/273,665, filed Oct. 29, 2021, and entitled "Coating for Aluminum Alloy Aerostructures", the disclosure of which is incorporated by reference herein in its entirety as if set forth at length.

BACKGROUND

The disclosure relates to gas turbine engines. More particularly, the disclosure relates to coatings for aluminum alloy aerostructures.

Gas turbine engines (used in propulsion and power applications and broadly inclusive of turbojets, turboprops, turbofans, turboshafts, industrial gas turbines, and the like) include various components made of aluminum alloy.

Structural aluminum alloy components (e.g., stator vanes) in gas turbine engines are prone to corrosion, hence are anodized to form a protective film.

SUMMARY

One aspect of the disclosure involves an airfoil element comprising: an airfoil having a pressure side and a suction side; an aluminum alloy substrate; and a coating system atop the substrate. The coating system comprises in at least one location: an anodize layer having a thickness ($T_A$) of 1.0 to 5.0 micrometers; a sealant filling at least 5.0% of porosity in the anodize layer or at least 0.7% of an apparent volume within a height of the anodize layer; a sealant primer filling 50.0% of porosity in the anodize layer or at least 6.5% of an apparent volume within a height of the anodize layer and extending at least flush to the anodize layer; a second primer over the sealant primer and having a thickness ($T_S$) of 5.0 micrometers to 50 micrometers; and a polymeric coating having a thickness ($T_T$) of 10.0 micrometers to 1.0 millimeter.

In an embodiment of the above, additionally and/or alternatively, the coating system is over an area of at least 1000 $mm^2$.

In a further embodiment of any of the foregoing embodiments, additionally and/or alternatively, the sealant primer fills more of the porosity than does the sealant.

In a further embodiment of any of the foregoing embodiments, additionally and/or alternatively, the sealant primer is proud of the anodize layer by 1.0 micrometer to 10.0 micrometers.

In a further embodiment of any of the foregoing embodiments, additionally and/or alternatively, the sealant comprises a corrosion inhibitor.

In a further embodiment of any of the foregoing embodiments, additionally and/or alternatively, the sealant corrosion inhibitor comprises zinc chromate or zinc molybdate.

In a further embodiment of any of the foregoing embodiments, additionally and/or alternatively, the anodize layer porosity is 13% to 75%.

In a further embodiment of any of the foregoing embodiments, additionally and/or alternatively: the sealant contains a chromate corrosion inhibitor; the sealant primer is a chromate primer; and the second primer is a zinc molybdate primer.

In a further embodiment of any of the foregoing embodiments, additionally and/or alternatively, the coating system is on at least 30% more of the pressure side than the suction side.

In a further embodiment of any of the foregoing embodiments, additionally and/or alternatively, the airfoil element is a stator vane having outer diameter shroud. It may further have an inner diameter platform or an inner diameter root button.

In a further embodiment of any of the foregoing embodiments, additionally and/or alternatively: the coating system is a first coating system along a first region of the pressure side of the airfoil; and a second coating system along a second region of the airfoil pressure side spanwise inboard of the first region lacks the topcoat but has said anodize layer and sealant and sealant primer.

In a further embodiment of any of the foregoing embodiments, additionally and/or alternatively: the first coating system is along at least 20% of the pressure side; and the second coating system is along at least 20% of the pressure side.

In a further embodiment of any of the foregoing embodiments, additionally and/or alternatively: the coating system is a first coating system along a first region of the pressure side of the airfoil; and a second coating system along a second region of the airfoil pressure side spanwise inboard of the first region lacks the topcoat but has said anodize layer and sealant and sealant primer and has said second primer thicker than the second primer of the first coating system.

In a further embodiment of any of the foregoing embodiments, additionally and/or alternatively, a gas turbine engine includes the airfoil element as a compressor vane.

In a further embodiment of any of the foregoing embodiments, additionally and/or alternatively, the coating system is on at least 30% more of the pressure side than the suction side.

In a further embodiment of any of the foregoing embodiments, additionally and/or alternatively: the coating system is a first coating system along a first region of the pressure side of the airfoil; and a second coating system along a second region of the airfoil pressure side spanwise inboard of the first region lacks the topcoat but has said anodize layer and sealant and sealant primer and has said second primer thicker than the second primer of the first coating system.

In a further embodiment of any of the foregoing embodiments, additionally and/or alternatively, a method for manufacturing the airfoil element comprises: applying the anodize layer by boric sulfuric acid anodization; and applying the sealant by immersing the anodized substrate in an acid solution with corrosion inhibitor; applying the sealant primer by spraying; applying the second primer by spraying; and applying the topcoat by spraying.

In a further embodiment of any of the foregoing embodiments, additionally and/or alternatively: the sealant primer is sprayed from less viscous stock than the second primer; and/or the sealant primer stock has a methyl ethyl ketone (MEK) solvent and a phenolic resin and epoxy resin base with strontium chromate; and/or the second primer stock is a chrome-free, water-borne, chemically cured, polyamide primer.

In a further embodiment of any of the foregoing embodiments, additionally and/or alternatively, a method for using the airfoil element comprises: flowing gas over the airfoil; subjecting a damage site to acidic attack; and metallic or metal oxide pigment in the second primer layer neutralizing the acid.

A further aspect of the disclosure involves, a method for processing an aluminum alloy substrate, the method comprising: boric-sulfuric acid anodizing (BSAA) leaving porosity; immersion infiltration of a sealer to partially fill the porosity; spraying a first primer to further fill the porosity; and spraying a second primer, more viscous than the first primer.

In a further embodiment of any of the foregoing embodiments, additionally and/or alternatively, the method further comprises spraying a topcoat.

In a further embodiment of any of the foregoing embodiments, additionally and/or alternatively, the spraying the topcoat comprises spraying a polymeric topcoat.

In a further embodiment of any of the foregoing embodiments, additionally and/or alternatively, the sealer is a chromate sealer.

In a further embodiment of any of the foregoing embodiments, additionally and/or alternatively, the applying the sealer comprises immersing the anodized substrate in an acid solution.

A further aspect of the disclosure involves an airfoil element comprising: an airfoil having a pressure side and a suction side; an aluminum alloy substrate; and a first coating system atop the substrate. The first coating system comprises on at least 20% of (optionally a majority of) the pressure side: an anodize layer having a thickness ($T_A$) of 1.0 to 5.0 micrometers; a sealant filling at least 5.0% of porosity in the anodize layer; one or more primer layers; a polymeric coating atop the one or more primer layers having a thickness ($T_T$) of 10.0 micrometers to 1.0 millimeter. A second coating system is atop the substrate and comprises on a majority of the suction side: an anodize layer having a thickness ($T_A$) of 1.0 to 5.0 micrometers; a sealant filling at least 5.0% of porosity in the anodize layer; one or more primer layers; and lacking a polymeric coating atop the one or more primer layers. Embodiments of this aspect may be as discussed above for the other aspects or further described below.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
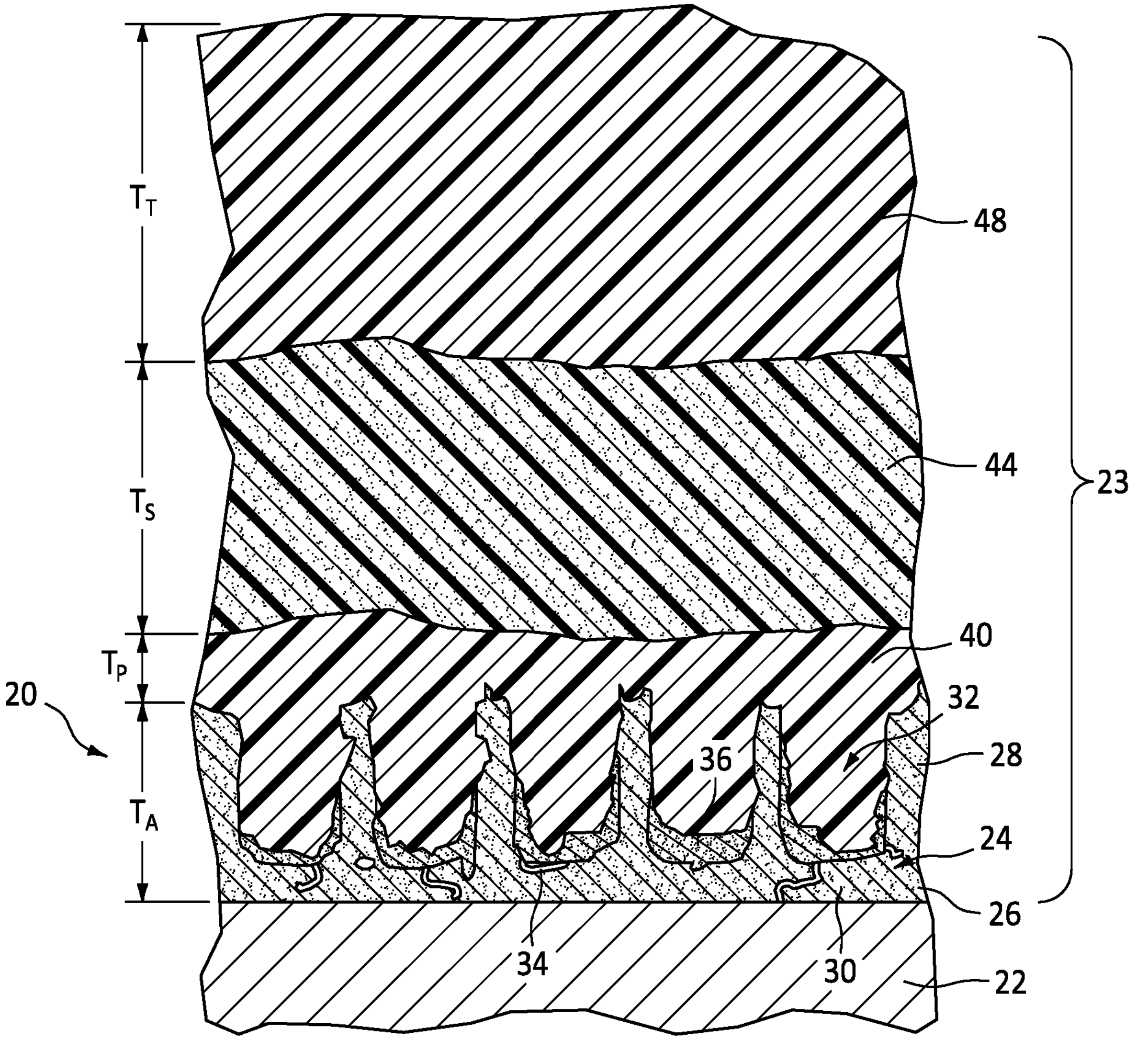
FIG. 1 is a partial schematic sectional view of a coated substrate.

FIG. 1 shows an article 20 comprising an aluminum alloy substrate 22 and a coating system 23. The coating system comprises an anodization film (anodic layer) 24 atop a surface of/boundary with 26 the substrate. The example anodization film 24 is of porous columnar structure having column walls 28 extending above a base section/sublayer (barrier region) 30 leaving columnar porosity cells 32 between adjacent wall sections. The anodization film 24 thickness or height is labeled $T_A$.

As is discussed further below, the base section 30 forms a barrier but is shown having defects 34 such as cracks, pinhole voids, and the like. These defects potentially expose the substrate to environmental attack. A sealant 36 (an inorganic sealant discussed below) coats/partially fills the cells 32 along the outer surface of the base section 30. This sealant 36 may block or fill the defects 34 to protect the substrate. This sealant may fill an example of 5.0% to 50.0% of the porosity of anodization film 24 (e.g., it may represent 0.7% to 37.5% of the apparent volume of the film within height $T_A$), More narrowly it may represent 2.0% to 15.0% of the apparent volume within the height $T_A$.

A corrosion-inhibiting sealant primer 40 (first primer layer) fills substantially a remainder of the cells 32 and protrudes (by a height $H_P$) above the anodization film 24. Sealant primer 40 fills an example of 50.0% to 95.0% of the porosity anodization film 24 (e.g., it may represent 6.5% to 71.3% of the apparent volume of material within the height $T_A$). More narrowly it may represent 10.0% to 50.0% of the apparent volume within the height $T_A$. It may represent an example at least 2.0 times the apparent volume represented by the sealant 36 within the height $T_A$. or an example 2.0 times to 100 times or 5.0 times to 50.0 times.

A second primer layer 44 is atop the sealant primer 40. The second primer layer functions to provide barrier properties and acts as a bonding intermediary to a topcoat 48. It may differ from the first primer layer in that the first primer stock is selected for infiltration ability whereas the second primer stock is selected for barrier properties without similar regard for infiltration ability. Thus, the second primer stock may be more viscous than the first primer stock (e.g., it may have more filler than the first primer stock such as is described below). The second primer 44 thickness or height is labeled $T_S$.

The topcoat 48 is atop the second primer layer 44. An example topcoat 48 is polymeric such as polyurethane. The topcoat functions to protect against erosion. In some embodiments, the topcoat may be eliminated altogether or limited to specific regions (e.g., those most subject to erosion and/or those most sensitive to erosion) so that the second primer layer is the outermost layer away from those regions. The topcoat 48 thickness or height is labeled $T_T$.

Figure 2:
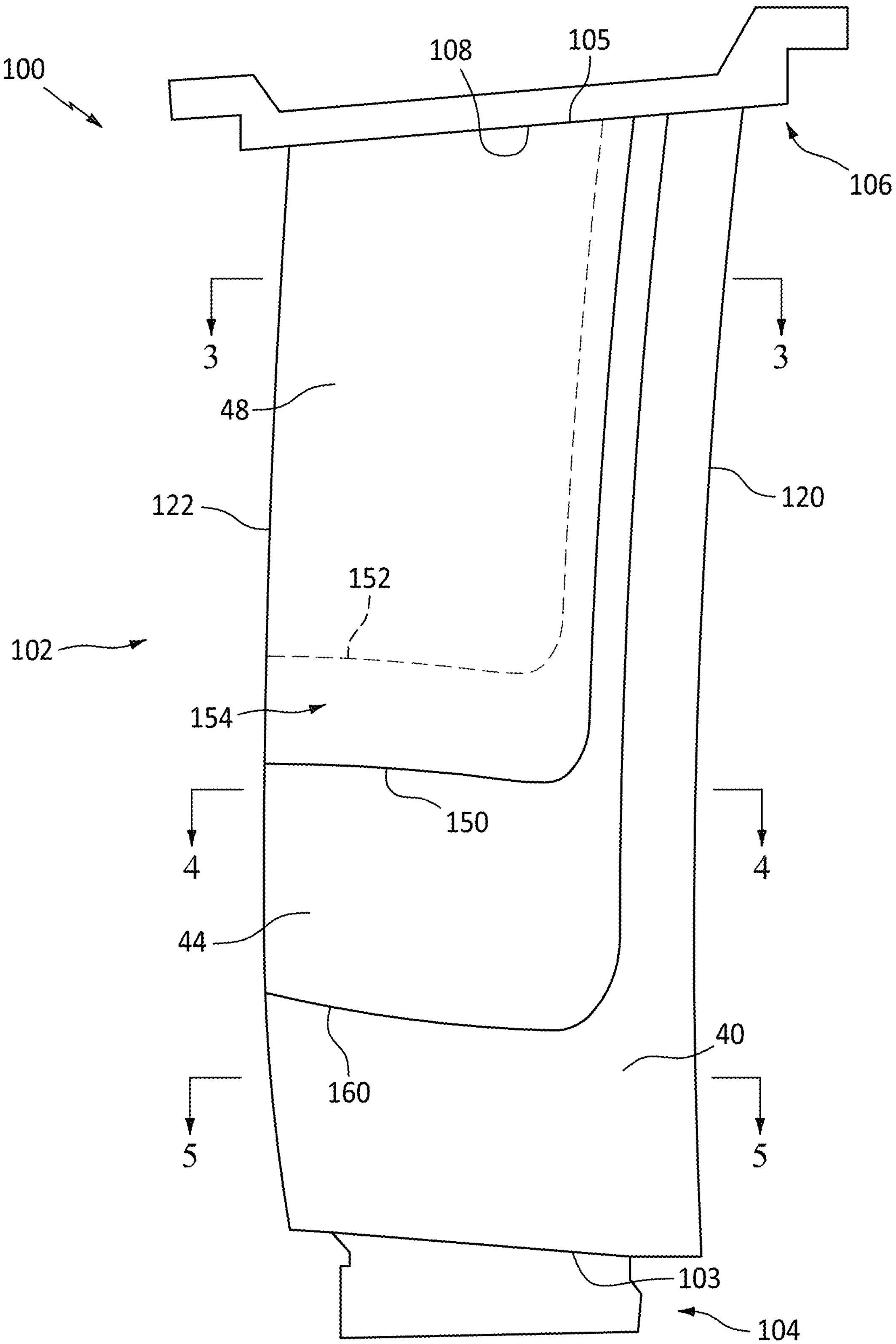
FIG. 2 is a pressure side view of a stator vane.
Figure 5:
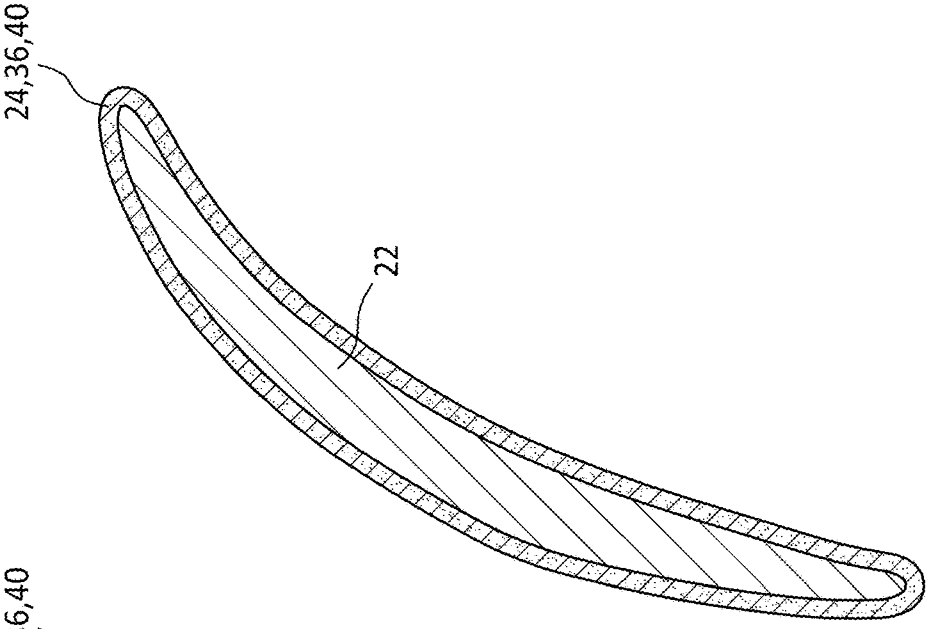
FIG. 5 is a schematicized first transverse sectional view of an airfoil of the stator vane, taken along line 5-5 of FIG. 2 showing coating layers with exaggerated thickness.
Figure 4:
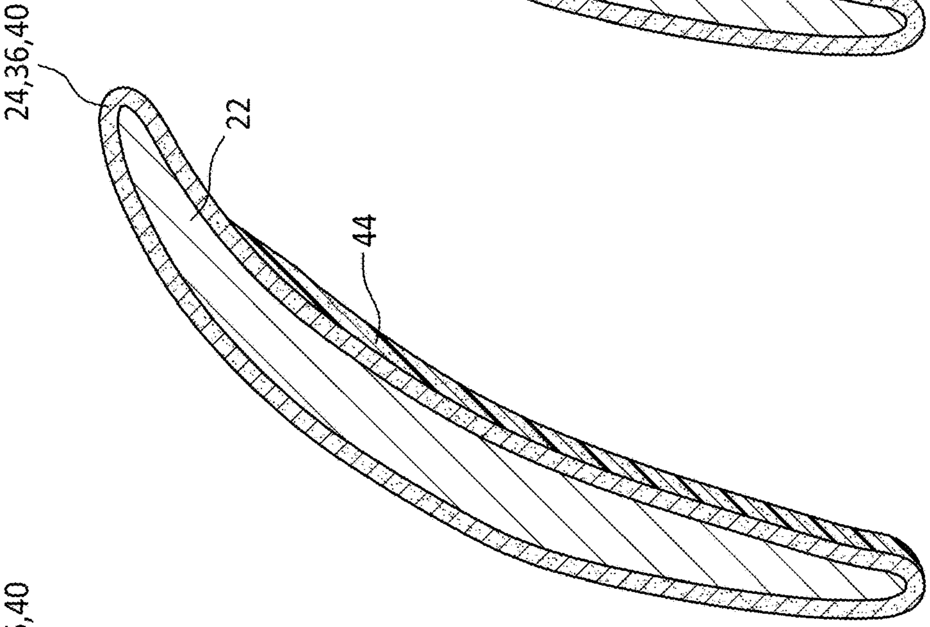
FIG. 4 is a schematicized first transverse sectional view of an airfoil of the stator vane, taken along line 4-4 of FIG. 2 showing coating layers with exaggerated thickness.
Figure 3:
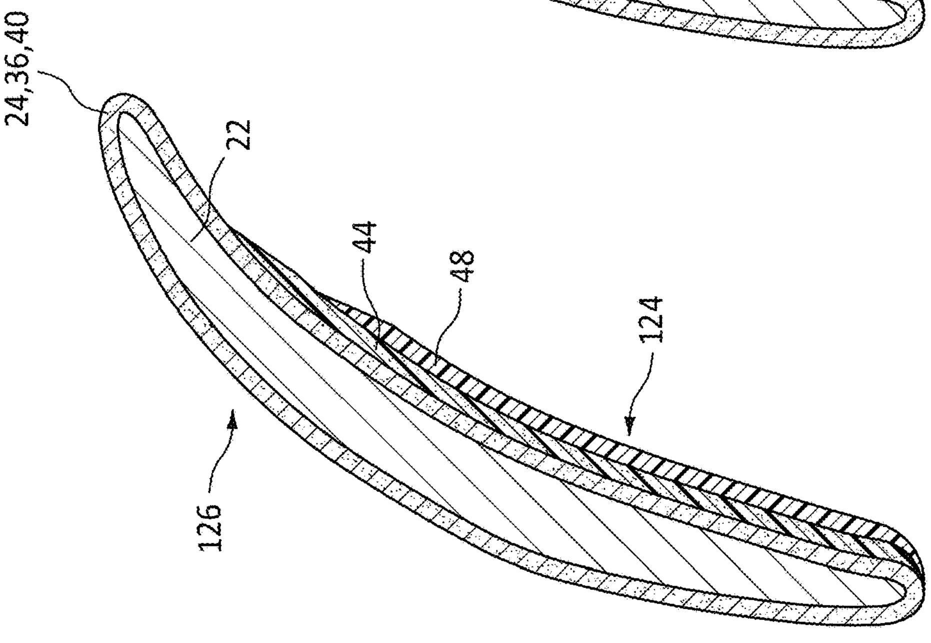
FIG. 3 is a schematicized first transverse sectional view of an airfoil of the stator vane, taken along line 3-3 of FIG. 2 showing coating layers with exaggerated thickness.

In one example, FIG. 2 shows the article 20 as a stator vane 100 having an airfoil 102 extending spanwise between an inner diameter (ID) end 103 at an ID structure 104 (shown as an attachment root button (e.g., held by a clip or resilient potting material), although ID platforms are alternatives as are fully cantilevered airfoils) and an outer diameter (OD) end 105 at a shroud 106. A fillet (not shown) may be formed at the airfoil-shroud junction. The OD shroud has an inner diameter (ID) gaspath-facing surface 108. The airfoil extends spanwise between a leading edge 120 and a trailing edge 122 and has a generally streamwise-concave pressure side 124 (FIG. 3) and a generally streamwise-convex suction side 126.

In operation, stresses will generally be concentrated in a specific area depending on the airfoil design and vibration modes. Certain vibratory modes during flight will become more detrimental for airfoil fatigue capability if the stressed areas experience corrosion. Therefore, enhanced protection in the area(s) of high stress will improve airfoil durability. In an example vane, there will be generally high stress near toward the OD end and trailing edge of the airfoil. This may result from several factors. More air will pass near the OD due to the greater radius from the engine centerline. Also, full or partial cantilevering (more robust mounting at the OD shroud) causes the airflow to exert moments about the OD end of the airfoil. The generally tensile stresses along the pressure side may be more problematic than corresponding compressive stresses along the suction side. Other mounting/attachment systems may cause other stress distributions and may include shifting the high stress region to the ID.

In some embodiments of such a vane, it may be advantageous to have a non-uniform coating distribution. The coating or layers thereof may be localized to high stress areas. Or the coating (or layer) thickness may be distributed with thicker coating (or layer) at the high stress area(s). This is discussed below.

In an example application method where the article is a stator vane, an initial aluminum alloy vane substrate 22 is formed. An example alloy is a 6000-Series aluminum-manganese-silicon alloy such as AA6061. An example formation is by casting and machining. One or more cleaning/degreasing steps may precede further processing. For example, an alkaline cleaning may involve immersion into a solution including sodium hydroxide. An example solution is 10% to 15% (volume) aqueous metal cleaner (e.g., ARMAKLEEN™ M-Aero of The Armakleen Company, Princeton, New Jersey) at 150 F for 10 to 15 min.

An example first general step in the coating process is an anodization step for forming the anodic layer 24. An example anodization is a boric sulfuric acid anodization (BSAA). Example BSAA comprises de-oxidization followed by anodization. Example de-oxidization involves immersion in an acidic (e.g., nitric acid) de-oxidizer for 1 to 10 min, more specifically 3 to 5 min, followed by deionized (D.I.) water rinse. Example anodization involves applying a DC voltage of 10 to 20 V to the substrate in an anodization bath (boric and sulfuric acid mixture) for 15 to 25 min.

The resulting anodization film 24 has a porous structure with alumina filament walls 28. The anodize cells grow out roughly normal/perpendicular to the aluminum surface in a packed array much like a honeycomb with series of mostly regular holes/pores extending from the top of the cell/column to near the aluminum metal surface. Such anodization film 24 is usually schematically represented with a hexagonal array for the wall centerlines (centerplanes) of the cell and a circular hole representing the pore. The columnar cellular structure in FIG. 1 is used for illustration purpose only.

An example anodization film 24 structure has a thickness of 1.0 micrometer to 5.0 micrometers, more narrowly 1.5 micrometers to 3.0 micrometers. The example anodization film 24 comprises a dense base/barrier region 30 at the interface between the anodization film 24 and substrate 22 and a porous body in the rest of the film (formed by the walls 28). The anodization film has a porosity of 13% to 75% (preferably 20% to 65% or 25% to 50%). Higher anodization temperatures promote a more porous film. However, a too high porosity can compromise corrosion resistance because the barrier layer may possess more defects.

In the example, the next general step is applying the inorganic sealant 36 to the anodic layer 24. This is done before the anodic layer hydrates naturally occluding the pores. For example, natural hydration converting alumina to aluminum hydroxide ($Al(OH)_3$, e.g., hydrargillite) would occur at room temperature in the presence of residual water entrapped from the anodization process in a few hours following anodization. Although aluminum oxy-hydroxide (AlO(OH), e.g., boehmite) is a more stable substance preferred for creating a physical barrier, the boehmite conversion has to be conducted at an elevated temperature below water's boiling point. In addition, the general hydrothermal sealing in the boehmite process would close some pores, which can compromise the subsequent sealant primer 40 infiltration and compromise corrosion protection. Therefore, it is preferred to have a chemical sealing process that will seal the base section 30 to create a less permeable barrier layer at the interface between the anodization film and substrate with pores remaining open for infiltration.

The example process for applying the inorganic sealant 36 comprises immersing the anodized substrate into a dilute acid (e.g., chromic acid) solution with corrosion inhibitors (e.g., potassium di-chromate provides the corrosion inhibitor). The example solution is at a moderate temperature (e.g., 50° C. to 90° C. for 15 min. to 30 min., more particularly 80° C. to 90° C. for 20 min. to 25 min.). The example sealing solution comprises as the corrosion inhibitor 5 ppm to 70 ppm (more particularly 35 ppm to 45 ppm) chromate ($CrO_4^-$) or di-chromate ($Cr_2O_7^-$) or the combination of both, or molybdate ($MoO_4^{2-}$) or vanadate ($VO_4^{3-}$), or trivalent chrome. Non-chromate sealers may be applied via a non-chromic acid immersion such as fluoric acid. Non-chromate sealants include LANTHANE 613.3 Conversion coating produced by Conventya International, Villeneuve-La-Garenne, France.

The resulting sealing may partially fill and narrow some pores but does not fully occlude the porosity of the porous structure of the anodization film 24. For example, the porosity/pores closer to substrate are preferentially filled with chemicals from the sealant solution or reaction products due to mass transport limitation.

In the example, the next general step is applying the sealant primer 40 to infiltrate remaining openings of the cellular structure. An example such sealant primer is an organic coating. An example organic coating may be a solvent-borne or a water-borne resin with additional corrosion inhibitor. This infiltrating material may be optimized for maximized penetration and filling into the pores which may include minimization/reduction of additives and fillers that inhibit infiltration. Such infiltrating material may be conventional or yet-developed chromate-containing bond primer as often used for acid anodized surfaces. Epoxy resin primers are a historically preferred choice for aluminum hardware that has been anodized. Examples of these epoxy resin primers are: a) typical chromate containing bond primers used normally for phosphoric acid anodized surfaces (e.g., BR127 (Solvay Composite Materials, Alpharetta, GA) or Scotch-Weld™ Structural Adhesives Primer EC-3917 (3M Automotive & Aerospace Solutions Division, St. Paul, MN—using a methyl ethyl ketone (MEK) solvent and a phenolic resin and epoxy resin base with strontium chromate corrosion inhibitor)); and b) primers using non-chromated inhibitor compounds (e.g., ECOTUFF™ corrosion inhibitor (Raytheon Technologies Corporation, Farmington, CT) or ECOSKY™ anti-corrosion pigment (Goodrich Corporation, Charlotte, NC)).

Example sealant primer layer 40 application is by spray (e.g., high volume low pressure (HVLP) spray). Example application forms the sealant primer layer 40 proud of the anodization film 24 (e.g., by the height $T_P$ of 0.0 micrometers to 10.0 micrometers, more particularly 1.0 micrometers to 10.0 micrometers or 2.0 micrometers to 5.0 micrometers). Excess thickness provides a fatigue debit.

A curing step may involve storing it at ambient conditions for a time needed for unassisted cure (e.g., several hours to several days). This may be deferred until co-curing with subsequent layer(s) if any. Alternate heated (e.g., elevated-temperature oven curings are possible).

The resulting structure has the primer 40 anchored in the anodization film 24 and at least flush to or extending above (proud of) the anodization film as noted above.

In the example, the next general step is applying a further primer to form the second primer layer 44 such as a traditional paint primer. The paint primer may contain corrosion inhibitors and mostly serves as either or both of an intermediary for bonding the topcoat 48 and a physical barrier to enable the protection rendered by the sealant primer underneath.

Example paint primers for the second primer layer 44 include room temperature curing epoxy based primers such as Deft 44GN098, Deft 02GN084 (PPG Architectural Finishes, Inc., Pittsburgh, PA—a chrome-free, water-borne, chemically cured, polyamide primer with corrosion inhibiting properties), Hentzen 17176KEP (Hentzen Coatings, Inc. Milwaukee, Wisconsin) (e.g., falling under MIL-PRF-23377, MIL-PRF-85285, or Def Stan 80-161) or Mg rich primer such as PREKOTE AE2100 (Pantheon Chemical, Inc., Phoenix, Arizona). Example corrosion inhibitor fillers include chromates and molybdates of zinc. Example physical property enhancing fillers include titanium dioxide, talc, carbon black, fumed silica, and aluminum flake (e.g. improving wear resistance, durability, and higher build thickness capability). Organic pigments may be used for color.

Other example paint primers include zinc molybdate alkyd primer (e.g., United States Military Specification TT-P-645, AMS 3117 zinc molybdate solvent-borne alkyd primer).

For example, the stock for the second primer layer 44 may be applied by spray (e.g., HVLP) or brush. In an example embodiment on airfoils, more extensive surface quality requirements favor the use of spray methods with brush only being used for local touch-ups.

Example application forms the second primer layer 44 with a thickness $T_S$ of 5.0 micrometers to 50.0 micrometers, more particularly 10.0 micrometers to 50.0 micrometers or 15.0 micrometers to 40.0 micrometers or 20.0 micrometers to 35.0 micrometers). Excess thickness may cause aerodynamic inefficiency. Insufficient thickness may provide insufficient corrosion inhibitor content and/or incomplete coverage due to variations.

A curing step may involve ambient cure as discussed above. As noted above, this may co-cure the layer 40. Similarly, it may be deferred to co-curing with the topcoat 48.

In the example, the next general step is applying the topcoat 48. The example topcoat is an erosion resistant topcoat. In some embodiments, it may be applied preferentially to the areas that are prone to particle impingement in certain operating environments. Example application forms the topcoat 48 with a thickness $T_T$ of 10.0 micrometers to 1.0 millimeter, more particularly 40.0 micrometers to 250.0 micrometers or 50.0 micrometers to 250.0 micrometers). Excess thickness may cause aerodynamic inefficiency. Insufficient thickness may provide insufficient erosion or other damage resistance.

In use, the consequences of local penetration of the coating may be mitigated. The sealant primer 40 may prevent lateral transport within the anodize layer of aqueous infiltrants at a damage site. Additionally, corrosion inhibitors in the sealant primer and the second primer (protected by intact topcoat around the damage site) may offer more available corrosion inhibitor at the penetration than if not protected by topcoat.

In some examples such as discussed below, the full five component coating system may exist on only a portion of a surface and elsewhere one or more layers may be omitted (e.g., the topcoat or the topcoat and second primer). For example, the topcoat may be omitted in low erosion areas. Where the topcoat is not applied, an unprimed but sealed anodic film would be subject to defeat by lesser foreign object damage and subject to corrosion. The primer combination limits the exposure of the substrate alloy due to damage in operation and thus limit the resulting exposure to deleterious chemicals such as acid from acid rain. The limited exposure enables a neutralization reaction between aluminum oxide of the anodic film and the acid to substantially reduce the likelihood of direct attack of the substrate airfoil. In an example where magnesium-rich or magnesium oxide primers (paint primer) are used as the second primer 44, the magnesium pigments will serve the same role to neutralize deleterious chemicals.

In example variations on substrate composition, the substrate may be a 2000-Series aluminum alloy containing copper and rare earth element(s) (e.g., AA2024 or AA 2014 or AA2060). 2000-Series alloys typically form a tortuous cellular structure when anodized. The copper rich phases distort the direction the cell grows from the surface and instead it results in a tortuous nest of intersecting pores. This structure is more readily closed off and clogged by the sealing process and the inhibitor migration to bared aluminum surfaces is also less direct. In such a porosity, the sealant 36 may leave greater open porosity in an outboard region of the anodic layer than in an inboard region. The open porosity is then largely filled by the sealant primer 40.

In example variations on anodization, a thin film sulfuric acid anodization is used. This may be particularly relevant when constrained by a baseline/legacy process and equipment. BSAA has advantages of lower porosity and more robust protection.

In example variations on topcoats 48, alternative materials include other polymers and enamels. Topcoats are applied 1.0 to 40 mils depending on the nature of the coating. Harder coating such as enamels may particularly advantageously be applied at the low end of the aforementioned range of $T_T$ (e.g., 10.0 micrometers to 150 micrometers) as may be hard urethane coatings such as per MIL-PRF-85582. Elastomeric coatings such as from softer urethanes, silicones, and fluoroelastomers may particularly advantageously be applied at the low end of the aforementioned range of $T_T$ (e.g., 100 micrometers to 1.0 millimeter or 200 micrometers to 1.0 millimeter) and are more resilient to impact and erosion.

In various optimizations for particular applications, the second primer is selected to provide a more resilient barrier to keep liquid water and salts from reaching the sealant primer or anodize layer. Corrosion inhibitor in the second primer also serves to provide additional protection in the instance of coating flaws and localized damage that exposes the substrate. It also acts as an ablative layer preventing the need for the sealant primer to consume its corrosion inhibitors.

Example paint primers used as the second primer include additional fillers that assist in the protection of the sealant primer layer/anodize layer and allow for substantially thicker layers and thus substantially (order of magnitude) more inhibitor to provide general protection to the substrate.

Thus, to protect the bond primer the sealant primer may be selected with inhibitor (e.g., molybdates) that will coordinate with the thin seal chemistry at sites of bared substrate.

Additionally, distribution and properties of the coating system may be tailored to address distribution of factors such as foreign object damage (FOD) susceptibility, propensity of attracting condensation, higher stress zones to maintain favorable Goodman margin, and the like.

Aspects of the distribution may involve applying the full coating in certain areas and no coating in others. However, a broader range includes providing the full coating in certain areas and omitting one or more layers in other areas. In particular, it may be appropriate to omit the top coat in certain areas. Thus, in situations where the top coat is omitted, there may be a feathering distribution of topcoat thickness at simply a spray periphery that determines the two regions (versus masking).

FIG. 2 shows one example of a distributed coating wherein the top coat 48 extends from a spanwise outboard periphery at the fillet between the gas path-facing surface 108 on the airfoil pressure side 124 to a second boundary 150 at an intermediate location along the span. The boundary 150 may represent the extreme of a tapering/feathering region 154 with an outboard boundary 152. Chordwise/streamwise/fore-to-aft/axially, in the illustrated example, full layering including the top coat 48 is similarly recessed along the pressure side from the leading edge and extends to the trailing edge. The pressure side experiences more erosion and erosion promoted corrosion in engine operation than other surfaces and the region. In alternative embodiments, the full layering may extend from the leading edge. In various embodiments, this full coating system may be over an area of at least 1000 $mm^2$.

A remainder of the pressure side may include the remaining layers of the coating, but, due to lower erosion may lack the topcoat and optionally the second primer. Thus, the second primer 44 may similarly feather (or be masked) with the topcoat. the illustrated example shows the second primer 44 extending inboard and upstream of the topcoat boundary 150 to a boundary 160. In some embodiments, the second primer 44 in the inboard region lacking the topcoat may be thicker than in the region with the topcoat.

Additionally, essentially the entire gaspath-facing surface of the vane (airfoil, shroud ID surface 108 and OD surface of any ID platform/shroud) may include the anodization layer 24, the sealant 36, and at least the first primer 40. But, for example, the suction side may lack the topcoat 48 and optionally also the second primer 44. Limitation of topcoat 48 and optionally the second primer 44 may limit aerodynamic debits. In some examples where the second primer 44 is on the suction side, it may wrap around the trailing edge and fall shy of the leading edge. Recessing from the leading edge on both sides helps avoid delamination. Additionally, it keeps the leading edge thin for aerodynamic efficiency.

Also in some embodiments where the second primer 44 is along the suction side, it may be thicker along the suction side than the pressure side (because its bond with the first primer does not also have to carry the load of the topcoat 48). Suction side cavitation may cause delamination of the topcoat 48 from the second primer 44. Thus, the extra second primer may provide extra protection without the same delamination.

Additionally, in further variations, the second primer 44 and optionally topcoat 48 may be on the shroud ID surface 108 and OD surface of any ID platform/shroud.

For example, a 0.5 to 5.0 mil (13 micrometer to 130 micrometer), more narrowly 20.0 micrometer to 100 micrometer, polyurethane topcoat 48 may be applied to both sides or just the pressure side. It may feather as discussed above. In an alternative embodiment, it may be at said thickness from the leading edge (covering 100% span) to the outer diameter (OD) end of the trailing edge tapering off in thickness toward the ID of the trailing edge and not covering a portion of the surface near the ID and trailing edge junction.

In another example, the topcoat 48 is applied only to the pressure side because the airfoil on the pressure side experiences more erosion and erosion promoted corrosion in engine operation. The topcoat is minimized in the thickness to reduce any potential aero efficiency impact.

More generally, the topcoat 48 is over more of the pressure side than the suction side (if at all). For example the topcoat 48 (with the underlying other layers) may be on at least 20% of the pressure side and at least 30% more of the pressure side than the suction side.

In a reengineering or remanufacturing situation, the substrate may be altered so that the localized coating does not alter the aerodynamic profile of the airfoil. For example, substrate camber may be increased to compensate for the coating and yield a similar overall contour to the baseline airfoil. Alternatively, material may be removed from the airfoil. For example, a machining, grinding, abrasive blast, or chemical etch may remove substrate material corresponding to the ultimate coating thickness to be added at each location.

Various implementations may have one or more of several advantages, for example, an existing design could possibly have a distributed coating applied as an added process without redesigning the underlying aerodynamic shape so long as the aerodynamic penalty is acceptable. A re-cambered vane can avoid aerodynamic penalty while having a more uniform coverage on both sides of the airfoil.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration of component, details of such baseline may influence details of particular implementations. Accordingly, other embodiments are within the scope of the following claims.

What is claimed is:

1. An airfoil element (20, 100) comprising:
- an airfoil (102) having a pressure side and a suction side;
- an aluminum alloy substrate (22); and
- a coating system (23) atop the substrate and comprising in at least one location:
  - an anodize layer (24) having a thickness ($T_A$) of 1.0 micrometer to 5.0 micrometers;
  - a sealant (36) filling at least 5.0% of porosity in the anodize layer or at least 0.7% of an apparent volume within a height of the anodize layer;
  - a sealant primer (40) filling 50.0% of porosity in the anodize layer or at least 6.5% of an apparent volume within a height of the anodize layer and extending at least flush to the anodize layer;
  - a second primer (44) over the sealant primer and having a thickness ($T_S$) of 5.0 micrometers to 50 micrometers; and a polymeric coating (48) having a thickness ($T_T$) of 10.0 micrometers to 1.0 millimeter, wherein:

the airfoil element is a stator vane having an outer diameter shroud;

the coating system is a first coating system along a first region of the pressure side of the airfoil; and a second coating system along a second region of the airfoil pressure side spanwise inboard of the first region lacks the topcoat but has said anodize layer, said sealant, and said sealant primer.

2. The airfoil element of claim 1 wherein:

the coating system is over an area of at least 1000 $mm^2$.

3. The airfoil element of claim 1 wherein:

the sealant primer fills more of the porosity in the anodize layer than does the sealant.

4. The airfoil element of claim 1 wherein:

the sealant primer is proud of the anodize layer by 1.0 micrometers to 10.0 micrometers.

5. The airfoil element of claim 1 wherein the sealant comprises:

a corrosion inhibitor.

6. The airfoil element of claim 5 wherein the sealant corrosion inhibitor comprises:

zinc chromate or zinc molybdate.

7. The airfoil element of claim 1 wherein:

the anodize layer porosity is 13% to 75%.

8. The airfoil element of claim 1 wherein:

the sealant contains a chromate corrosion inhibitor;

the sealant primer is a chromate primer; and the second primer is a zinc molybdate primer.

9. The airfoil element of claim 1 wherein:

the coating system is on at least 30% more of the pressure side than the suction side.

10. The airfoil element of claim 1 wherein:

the first coating system is along at least 20% of the pressure side; and/or the second coating system is along at least 20% of the pressure side.

11. The airfoil element of claim 1 wherein:

the second coating system has said second primer thicker than the second primer of the first coating system.

12. A gas turbine engine including the airfoil element of claim 1 as a compressor vane.

13. The gas turbine engine of claim 12 wherein:

the coating system is on at least 30% more of the pressure side than the suction side.

14. The gas turbine engine of claim 13 wherein:

the second coating system has said second primer thicker than the second primer of the first coating system.

15. A method for manufacturing the airfoil element of claim 1, the method comprising:

applying the anodize layer by boric sulfuric acid anodization; and applying the sealant by immersing the anodized substrate in an acid solution with corrosion inhibitor;

applying the sealant primer by spraying;

applying the second primer by spraying; and applying the topcoat by spraying.

16. The method of claim 15 wherein:

the sealant primer is sprayed from less viscous stock than the second primer; and/or the sealant primer stock has a methyl ethyl ketone (MEK) solvent and a phenolic resin and epoxy resin base with strontium chromate; and/or the second primer stock is a chrome-free, water-borne, chemically cured, polyamide primer.

17. A method for using the airfoil element of claim 1, the method comprising:

flowing gas over the airfoil;

subjecting a damage site to acidic attack; and metallic or metal oxide pigment in the second primer layer neutralizing the acid.

18. A method for manufacturing an airfoil element (20; 100), the airfoil element comprising:

an airfoil (102) having a pressure side and a suction side;

an aluminum alloy substrate (22); and a coating system (23) atop the substrate and comprising in at least one location:

an anodize layer (24) having a thickness ($T_A$) of 1.0 micrometer to 5.0 micrometers;

a sealant (36) filling at least 5.0% of porosity in the anodize layer or at least 0.7% of an apparent volume within a height of the anodize layer;

a sealant primer (40) filling 50.0% of porosity in the anodize layer or at least 6.5% of an apparent volume within a height of the anodize layer and extending at least flush to the anodize layer;

a second primer (44) over the sealant primer and having a thickness ($T_S$) of 5.0 micrometers to 50 micrometers; and a polymeric coating (48) having a thickness ($T_T$) of 10.0 micrometers to 1.0 millimeter, the method comprising:

applying the anodize layer by boric sulfuric acid anodization; and applying the sealant by immersing the anodized substrate in an acid solution with corrosion inhibitor;

applying the sealant primer by spraying;

applying the second primer by spraying; and applying the topcoat by spraying, wherein:

the sealant primer is sprayed from less viscous stock than the second primer; and/or the sealant primer stock has a methyl ethyl ketone (MEK) solvent and a phenolic resin and epoxy resin base with strontium chromate; and/or the second primer stock is a chrome-free, water-borne, chemically cured, polyamide primer.

19. The method of claim 18 wherein:

the sealant primer is sprayed from less viscous stock than the second primer.

20. The method of claim 19 wherein:

the sealant primer stock has a methyl ethyl ketone (MEK) solvent and a phenolic resin and epoxy resin base with strontium chromate.

21. The method of claim 20 wherein:

the second primer stock is a chrome-free, water-borne, chemically cured, polyamide primer.

22. The method of claim 18 wherein:

the sealant primer stock has a methyl ethyl ketone (MEK) solvent and a phenolic resin and epoxy resin base with strontium chromate.

23. The method of claim 18 wherein:

the second primer stock is a chrome-free, water-borne, chemically cured, polyamide primer.

24. The method of claim 18 wherein:

the airfoil element is a stator vane having an outer diameter shroud.

* * * * *